March 19, 1935.  S. F. DAVENPORT  1,994,692
FLY ROD LURE
Filed July 6, 1932
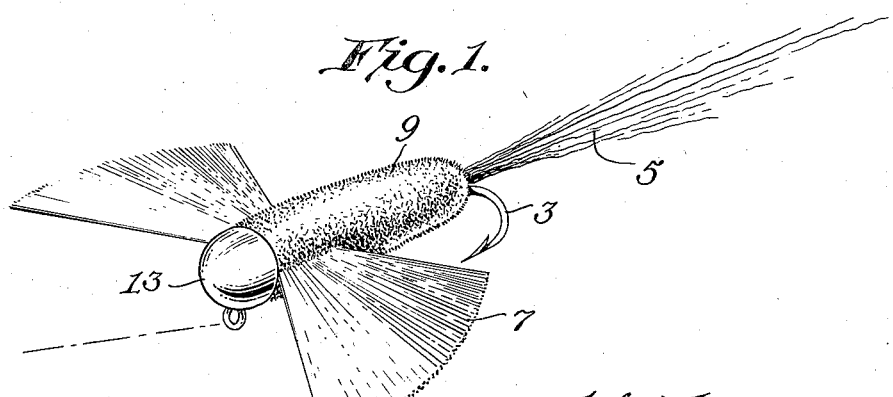
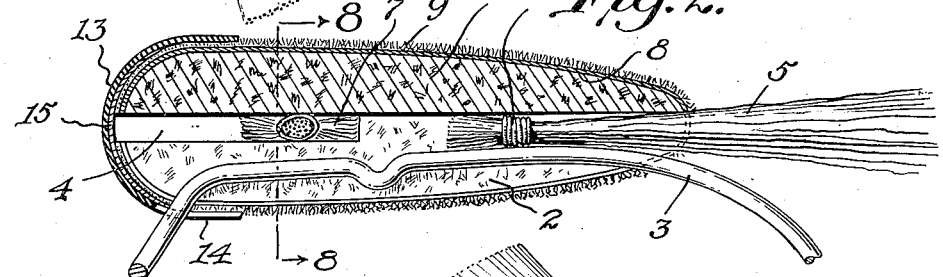
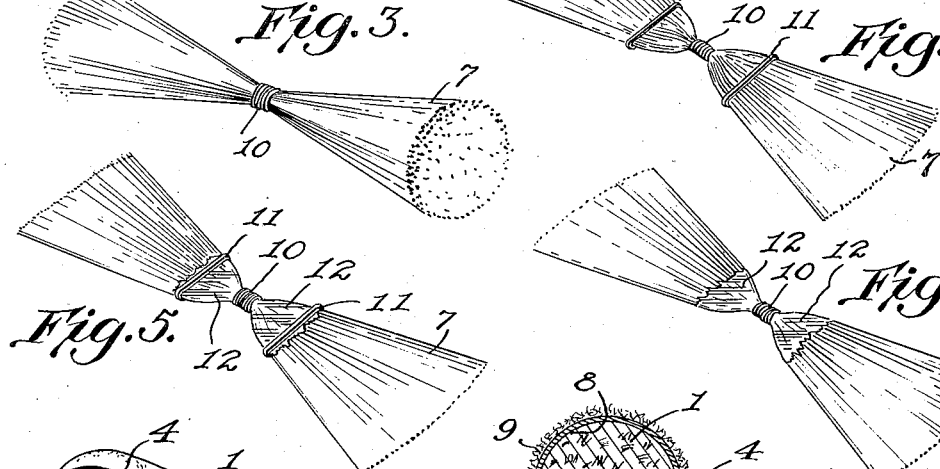
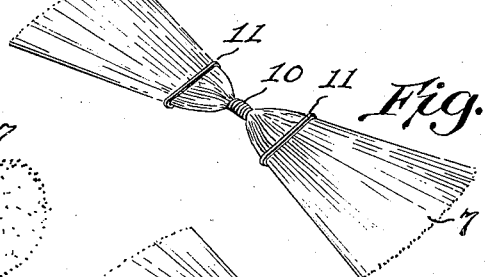
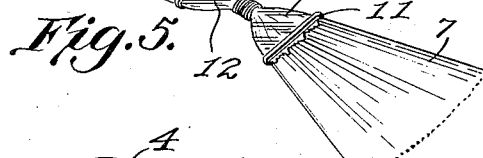
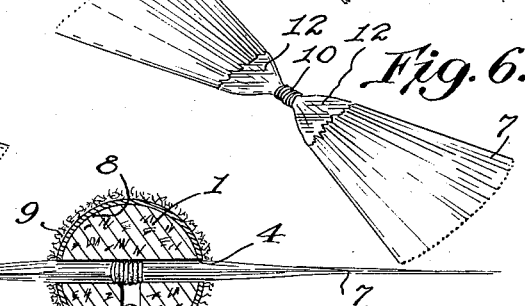
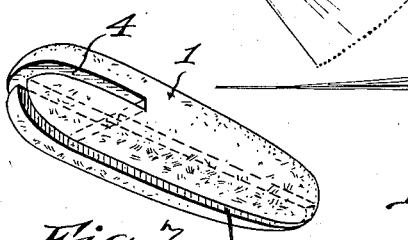
Inventor
S. F. Davenport
By Eccleston & Eccleston,
Attorneys Patented Mar. 19, 1935

1,994,692

UNITED STATES PATENT OFFICE 1,994,692

FLY ROD LURE

Sam F. Davenport, Garrett, Ind., assignor to Creek Chub Bait Company, Garrett, Ind.

Application July 6, 1932, Serial No. 621,105

6 Claims. (Cl. 43—48)

This invention relates to artificial lures of the general type used with fly rods and has for its purpose to improve the appearance of such lures and at the same time render them more durable without substantial increase in the cost of production.

Another object of the invention resides in the provision of a new construction of lure body and process of producing it.

A further object of the invention consists in a novel method of preparing the wings for application to the lure body in a more nearly perfect simulation of an insect.

A still further object of the invention consists in providing a cap in representation of the head of an insect, and which further serves to reinforce and tie together the various elements combined to form the completed lure.

Other objects and advantages of the invention will be apparent from the following description when taken in connection with the accompanying drawing, in which Figure 1 is a perspective view of the completed lure ready for use.

Figure 2 is a longitudinal sectional view of the lure.

Figures 3, 4, 5 and 6 are perspective views of the wings showing the successive steps employed in their production.

Figure 7 is a perspective view of the lure body prior to the application of the surface coating, hook, etc., and Figure 8 is a transverse sectional view taken on line 8—8 of Figure 2.

The lure of the present invention is a very close representation of a winged insect, and the essential features of the invention relate to the production of a fuzzy coating of appropriate color on the body of the lure, a smooth rounded head which is common in a large variety of insects, and thin, flexible, flat wings of hair as distinguished from the thick and clumsy constructions of the prior art.

More specifically, the numeral 1 indicates the lure body which is preferably formed of cork or other buoyant material and provided with a longitudinal slot 2 by means of which the hook 3 is mounted. A horizontal, transverse slot 4 is also formed in the front end of the lure for the reception of the flat, hair wings as will appear hereinafter.

A tail 5 consisting of a bundle of hairs, preferably secured by a silk cord 6, is mounted in the slot 2 above the hook 3 and projects rearwardly as indicated. The wings 7 are then mounted in the transverse slot 4 and the body is ready to receive the finish.

In preparing the body of the lure to present the appearance and texture of the body of an insect the cork or other material of which the lure is mainly formed is first coated with a waterproof adhesive such as varnish, lacquer, or shellac. This coating, which is indicated by the numeral 8, may be applied to the body of the lure by spraying or in any other desired manner. Immediately thereafter or before the coating has dried out the finishing material 9 is applied to the body, preferably by blowing. This material is in the form of a suitably colored powder which will mat easily and yet has a pronounced grain or fiber. The brushings of rough paper stock, such as, blotting paper, cellulosic materials, clipped furs and fibrous materials have all been found to be effective in simulating the covering of insect bodies. Before being applied the powdery material is tinted the desired color, and after the adhesive has dried the excess material is brushed off leaving a finish closely resembling the texture of an insect's covering.

The wings 7 of the simulated insect are formed of hairs which are first tied into a bundle. A thread of silk or the like 10 is used for this purpose and is wrapped tightly about the middle of the bundle of hairs causing them to flare outwardly in the form of tufts as indicated in Figure 3. The bundles are then placed in ordinary stapling machines such as are used in offices. The pressure of the hammer and anvil of these machines spreads the hairs out flat as shown in Figure 4 and the staples 11 are then applied. The next step in the process consists in applying a drop of lacquer or other cement 12 to the partly formed wings at each side of the cord 10 between the staples 11. This material permeates the bundle of hairs adjacent the cord 10 and when dried serves to firmly hold the hairs in their flattened condition. The staples 11 are now removed and the wings are completed and in the form shown in Figure 6. They are now positioned in the slot 4 of the lure body with the flattened portions 7 extending to either side of the body. This method of forming the wings forms the subject matter of my divisional application Ser. No. 746,229, filed September 29, 1934.

The lure is completed by the attachment of a head closely resembling the head of an insect. In the present embodiment of the invention the head preferably consists of a celluloid cap 13 provided with a slot 14 for engagement over the shank of the hook 3. In applying this element a few drops of lacquer or other adhesive are first placed in the cap and it is then forced onto the front end of the lure body. The adhesive, of course, spreads over the end of the lure as indicated by numeral 15 and serves to firmly unite the cap and lure body. Moreover, the cap 13 not only provides a neat finish for the head end of the lure, but it also binds together as a unit the several sections of the body which would otherwise be weakened by reason of the slots 2 and 4.

From the above description and the attached drawing it will be apparent to those skilled in the art that I have devised a very neat and attractive fly rod lure which closely resembles an insect; that the wings which are made of hair are nevertheless caused to lie out flat like the wings of a bug; that the body of the lure has the texture and general appearance of the body of an insect; and that the head is smooth and rounded so as to closely simulate the head of an insect.

In accordance with the patent statutes I have described what I now believe to be the preferred embodiment of the invention and the method of preparing the same, but various changes and modifications may be made in the embodiment disclosed herein without departing from the spirit of the invention, and all such changes and modifications are intended to be included within the scope of the appended claims.

What I claim is:

1. A lure including a body portion having slots extending longitudinally for reception of a hook and extending transversely for the reception of wings, and a cap in simulation of the head of an insect adhesively secured to the front end of the body for reenforcing and completely covering the front end of the body portion and slots.

2. In a lure having a slot, a pair of wings comprising a bundle of hairs secured together by a tie intermediate their ends, and means for holding the hairs in flat condition, said tie being adapted to be secured and concealed within the slot.

3. In a lure having a slot, a pair of wings comprising a bundle of hairs secured together by a tie intermediate their ends, and adhesive material applied to the hairs intermediate their ends for holding the same in flat condition, said tie being adapted to be secured and concealed within the slot.

4. A lure comprising a buoyant body provided with longitudinal and transverse slots, a fish hook having its shank positioned in the longitudinal slot, a wing member positioned in the transverse slot, and a cap of cellulose material applied to the front end of the body in simulation of the head of an insect and completely covering the front end of both slots.

5. A lure including a hook, a body portion mounted on the shank of the hook in simulation of an insect, and an imperforate cup-shape member having a rounded base applied to the end of the body portion in simulation of the head of an insect.

6. A lure including a buoyant body, wings of hair mounted on the body, and means applied to that portion of the hairs which form the wings for holding the hairs in a substantially flat condition upon opposite sides of the body and in the same plane.

SAM F. DAVENPORT.